W. H. STAHR.
HAIR CUTTING DEVICE.
APPLICATION FILED MAY 14, 1920.

1,378,911. Patented May 24, 1921.

Inventor:
Wilbert H. Stahr,
By Charles M. Nissen
Atty.

UNITED STATES PATENT OFFICE.

WILBERT H. STAHR, OF ELGIN, ILLINOIS, ASSIGNOR OF ONE-HALF TO ALBERT D. SMITH, OF ELGIN, ILLINOIS.

HAIR-CUTTING DEVICE.

1,378,911. Specification of Letters Patent. Patented May 24, 1921.

Application filed May 14, 1920. Serial No. 381,262.

*To all whom it may concern:*

Be it known that I, WILBERT H. STAHR, a citizen of the United States, residing at Elgin, in the county of Kane and State of Illinois, have invented certain new and useful Improvements in Hair-Cutting Devices, of which the following is a specification.

My invention relates to hair-cutting devices and has for one of its objects the provision of a simple and efficient device of this character.

A further object is the provision of a simple and efficient hair-cutting device having a cutting blade adapted for movement substantially longitudinally of its cutting edge and teeth adapted for movement toward the cutting edge of the blade.

Other objects will appear hereinafter.

An embodiment of my invention is illustrated in the accompanying drawing, forming a part of this specification, and in which—

Figure 1:
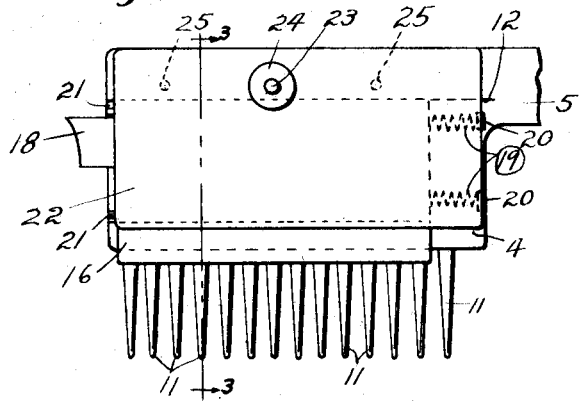
Figure 1 is a side view of a hair-cutting device embodying my invention but indicated with the handle broken off.

Referring more particularly to the drawing, I have indicated a body portion 4 having a handle 5 at one end thereof. The handle 5 is shown as being broken away and any desired form of handle may be provided to suit the user.

Figure 3:
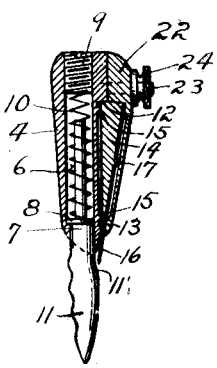
Fig. 3 is a section taken on line 3—3 of Fig. 1.

The body 4 has a plurality of sockets 6, one of which is shown in Fig. 3. In each of the sockets 6 is a tooth shank 7 with an enlargement 8 normally resting against the bottom of the socket 6. The upper end of the socket 6 is threaded with a screw 9 fitted therein. Between the enlargement 8 and the screw 9 is a compression spring 10 which normally holds the enlargement 8 against the bottom of socket 6 and leaving the shank 7 free to move upwardly against the influence of spring 10. On the bottom of each shank 7 is a tooth 11 which can be given any preferred form. It will also be apparent that the size and number of teeth may be provided as desired.

Figure 2:
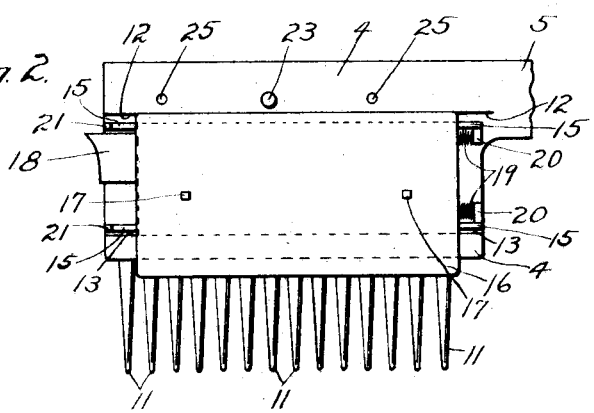
Fig. 2 is a view similar to Fig. 1, except having the cover plate removed to expose underlying parts.

On one side of the body 4 are two shoulders 12 and 13 forming a guide in which is mounted a blade support 14. In order to make the blade holder move with a minimum amount of friction on the body 4 I provide ribs 15 under the blade support. On the outer side of the blade support is disposed a blade 16 which may be of any approved design and may be provided with cutting edges at both its longitudinal edges, or, in any desirable manner. One edge, of course, is all that is used at a time, and this cutting edge extends down adjacent the teeth 11, as clearly indicated. The blade support 14 is preferably provided with lugs 17 which extend through suitable perforations in the blade 16 so as to cause the blade to move along with the blade support. At one end of the blade support 14 is a thumb member 18 by means of which an operator can move the blade support in one direction in the guide 12—13. At the other end of the blade support 14 is one or more compression springs 19 which engage upwardly extending lugs 20 on the body 4. These springs are adapted to move the blade support and blade in the other direction. The movement of the blade support by the springs 19 is limited by lugs 21 on the ends of the ribs 15, as clearly indicated in Fig. 2.

A cover plate 22 is disposed on the outer side of the blade 16 and has portions pressing on the outer side of the blade adjacent the longitudinal edges of the latter so as to produce a minimum amount of friction. The middle part of the cover plate 22 is cut away so as to permit the lugs 17 to have ample room to move in, see Fig. 3. The cover 22 is held by means of a stud 23 on the body 4 with a knurled nut 24 threaded on the stud. Also, to prevent rotary movement of the cover about the stud 23 dowel pins 25 may be provided, see Figs. 1 and 2.

It will be observed that the blade support is angular in cross-section so as to hold the blade at an angle to the teeth 11. The teeth are each provided with a portion 11' slightly angular with respect to the movement of its shank so that as the teeth 11 yield upwardly toward the body 4 the portion 11' will gradually approach the edge of the blade 16.

In use an operator grasps the device by the handle with his thumb or a finger on member 18 to move the blade longitudinally of the body in its guide. As soon as he releases the member 18 the springs 19 will move the blade and its support back to its position shown in Fig. 1. The operator moves the teeth 11 through his hair while the blade and its support are being moved longitudinally of the body. This draws the blade edge across the teeth and effectively cuts the hair without pulling. By having the teeth mounted resiliently they will yield when passing over inequalities or curvatures of the head. Also, by pressing on the body so as to partially force the teeth toward the comb the device will cut the hair shorter than when the teeth are farther out and the blade is farther from the teeth. Also, the screws 9 can be adjusted to provide the desired tension on the teeth.

I preferably provide the cover plate 22 in a length to entirely cover the springs 19, guide-way 12—13, blade support 14 and blade 16, as indicated in Fig. 1. The teeth 11 may also be corrugated on their inner or under sides, as indicated in Fig. 3, when so desired.

I claim:—

1. A hair-cutting device comprising a body; a blade mounted for movement on the body; and teeth mounted for movement transversely with respect to the cutting edge of the blade.

2. A hair-cutting device comprising a body; a blade mounted for movement on and longitudinally of the body; and teeth mounted for lateral movement independently of each other and with respect to the body.

3. A hair-cutting device comprising a body with a guide disposed longitudinally thereof; a blade support mounted on the guide; a blade held in the guide; and resiliently mounted teeth in the body, each tooth being adapted for movement independently of the other teeth.

4. A hair-cutting device comprising a body with a guide extending longitudinally thereof and tooth sockets extending transversely thereof; a tooth shank in each socket; a spring pressing on each shank; an adjustable member engaging each spring for varying the tension of the latter; a blade mounted in said guide; and a tooth on each shank, said teeth having portions adapted to approach the blade edge when the tooth shank moves against the spring.

5. A hair-cutting device comprising a body; a blade support slidably mounted on the body; a plurality of teeth slidably mounted in the body for movements at angles to the movement of the blade support; a blade on the blade support with its edge adjacent said teeth, there being portions of the teeth adapted to approach the blade edge upon movement of the teeth toward the body.

6. A hair-cutting device comprising a body; teeth extending from the body and adapted to move toward the latter; and a blade mounted on the body, there being portions of the teeth adapted to approach the blade edge upon movement of the teeth toward the body.

7. A hair-cutting device comprising a body; a blade mounted on the body and adapted for movement substantially parallel with its cutting edge; and teeth mounted in the body and adapted for movement toward the cutting edge of the blade.

In testimony whereof I have signed my name to this specification on this 11 day of May, A. D. 1920.

WILBERT H. STAHR.